(12) United States Patent
Vandergon et al.

(10) Patent No.: US 11,106,191 B2
(45) Date of Patent: Aug. 31, 2021

(54) MULTI-SENSOR ANALYSIS AND DATA POINT CORRELATION FOR PREDICTIVE MONITORING AND MAINTENANCE OF A PRESSURIZED FLUID CUTTING SYSTEM

(71) Applicant: HYPERTHERM, INC., Hanover, NH (US)

(72) Inventors: Cedar Vandergon, New Brighton, MN (US); David Osterhouse, New Brighton, MN (US); Steven Voerding, New Brighton, MN (US); Sara Mancell, Ham Lake, MN (US); Paul T. Fransen, Mounds View, MN (US); Kimberly Catten Ely, St. Paul, MN (US); Jon Lindsay, Grantham, NH (US); Garrett Quillia, Enfield, NH (US); Brett Hansen, Mapleton, UT (US)

(73) Assignee: Hypertherm, Inc., Hanover, NH (US)

( * ) Notice: Subject to any disclaimer, the term of this patent is extended or adjusted under 35 U.S.C. 154(b) by 251 days.

(21) Appl. No.: 16/135,567

(22) Filed: Sep. 19, 2018

(65) Prior Publication Data
US 2020/0089190 A1    Mar. 19, 2020

(51) Int. Cl.
| | |
|---|---|
| *G05B 19/4065* | (2006.01) |
| *B24C 5/02* | (2006.01) |
| *G05B 19/18* | (2006.01) |
| *G06F 17/15* | (2006.01) |

(52) U.S. Cl.
CPC ............ *G05B 19/4065* (2013.01); *B24C 5/02* (2013.01); *G05B 19/182* (2013.01); *G06F 17/15* (2013.01); *G05B 2219/45036* (2013.01); *G05B 2219/50185* (2013.01)

(58) Field of Classification Search
CPC .............. G05B 19/4065; G05B 19/182; G05B 2219/45036; G05B 2219/50185; G05B 23/0221; B24C 5/02; G06F 17/15
See application file for complete search history.

(56) References Cited

U.S. PATENT DOCUMENTS

| | | | | |
|---|---|---|---|---|
| 9,993,934 | B2 * | 6/2018 | Vandergon | B26F 3/004 |
| 10,430,038 | B2 * | 10/2019 | Williams | G06T 11/206 |
| 2008/0103629 | A1 * | 5/2008 | Milanovic | G05B 9/02 |
| | | | | 700/282 |
| 2015/0251331 | A1 * | 9/2015 | Vandergon | F04B 49/10 |
| | | | | 83/177 |
| 2017/0226842 | A1 | 8/2017 | Omont et al. | |
| 2019/0048988 | A1 * | 2/2019 | Besser | H02K 11/35 |

FOREIGN PATENT DOCUMENTS

| | | |
|---|---|---|
| WO | 2015164459 A1 | 10/2015 |
| WO | 2017048788 A1 | 3/2017 |

* cited by examiner

*Primary Examiner* — Alexander Satanovsky
*Assistant Examiner* — Yossef Korang-Beheshti
(74) *Attorney, Agent, or Firm* — David B. Tingey; Bryant J. Keller; Kirton McConkie (57) ABSTRACT

A method and system utilizing multi-sensor analysis and data point correlation is provided for predictive monitoring and maintenance of a pressurized fluid cutting system. In a disclosed aspect, multiple sensed characteristics of system operation are correlated to determine a particular failure mode. Identification of the failure mode through active sensor data analysis and correlation facilitates predictive maintenance, minimizes system downtime, and optimizes system output.

20 Claims, 3 Drawing Sheets

MULTI-SENSOR ANALYSIS AND DATA POINT CORRELATION FOR PREDICTIVE MONITORING AND MAINTENANCE OF A PRESSURIZED FLUID CUTTING SYSTEM

BACKGROUND

Technical Field

This disclosure relates generally to maintenance of pressurized fluid cutting systems and more particularly to multi-sensor analysis and data point correlation for predictive monitoring and maintenance of a pressurized fluid cutting system.

State of the Art

Components of pressurized fluid cutting systems, such as waterjet cutting systems, often fail or wear out and need to be replaced to maintain operability of the cutting systems. Various components have different life durations and components can, at times, fail with little warning. Some components, such as nozzles and orifices may only last a few hours, while other components, such as check valves, cylinders and seals may last hundreds of hours. The lifespan of each component is somewhat dependent on the conditions a cutting system is being operated at, where, in general, components in systems operating at lower pressures will fail less frequently than those in systems operating at higher pressures, but that is not always the case. When a component fails the cutting system typically must be stopped and the component repaired or replaced. This results in costly down time (lost operational output and monetary revenue) and maintenance costs (a pressurized fluid cutting system can take many hours to disassemble and reassemble). The costs associated with down time and maintenance are often much higher than the cost of the component itself. When a cutting system fails or begins to operate inefficiently, it may be difficult to determine which specific component(s) are responsible for the failure or decreased operability of the system, thus requiring extensive diagnostic procedures to find the failed component(s). Diagnostic procedures further add to the maintenance cost and downtime financial losses of the cutting system operator.

As a result of the high maintenance costs/man hours and unpredictability of component failure associated with pressurized fluid cutting systems, many operators track hours of use of the various components and, in the event of a failure, frequently choose to replace not only the failed component(s) but several other components which may still have significant amounts of useable life remaining, so as to avoid having to incur further maintenance costs at a later date (essentially a form of preventative maintenance). Hence, there is a need for active diagnostics facilitated by multi-sensor input, analysis and data point correlations for predictive monitoring and maintenance of a pressurized fluid cutting system, to accurately predict a specific impending failure or diagnose a specific root cause of a failure, to thereby optimize service and replacement of pressurized fluid cutting system components and to minimize downtime.

SUMMARY

An aspect of the present disclosure provides a method of identifying a failing component in an operating pressurized fluid cutting system, the method comprising: actively sensing a first characteristic of the pressurized fluid cutting system and gathering data pertaining to the sensed first characteristic; actively sensing a second characteristic of the pressurized fluid cutting system and gathering data pertaining to the sensed second characteristic; analyzing the data associated with the sensed first characteristic and the sensed second characteristic; and identifying a failing component based upon the analysis of the data associated with the sensed first and second characteristics.

Another aspect of the present disclosure provides a method of identifying a failing component in a pressurized fluid cutting system, the method comprising: sensing a first characteristic of the pressurized fluid cutting system using a first measurement methodology; sensing a second characteristic of the fluid cutting system using a second measurement methodology; and correlating the sensing of the first characteristic and the sensing of the second characteristic to the identification of a failing component of the pressurized fluid cutting system.

Still another aspect of the present disclosure provides a system for identifying a failing component of a fluid cutting system, comprising: a computer; a first sensor in electrical communication with the computer and configured to sense a first characteristic of a fluid cutting system; a second sensor in electrical communication with the computer and configured to sense a second characteristic of the fluid cutting system; and a user interface in communication with the computer and configured to display indicia of a failing component, wherein the indicia of the failing component is generated by correlating a first sensed characteristic of the fluid cutting system with a second sensed characteristic of the fluid cutting system to identify the failing component by the computer.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
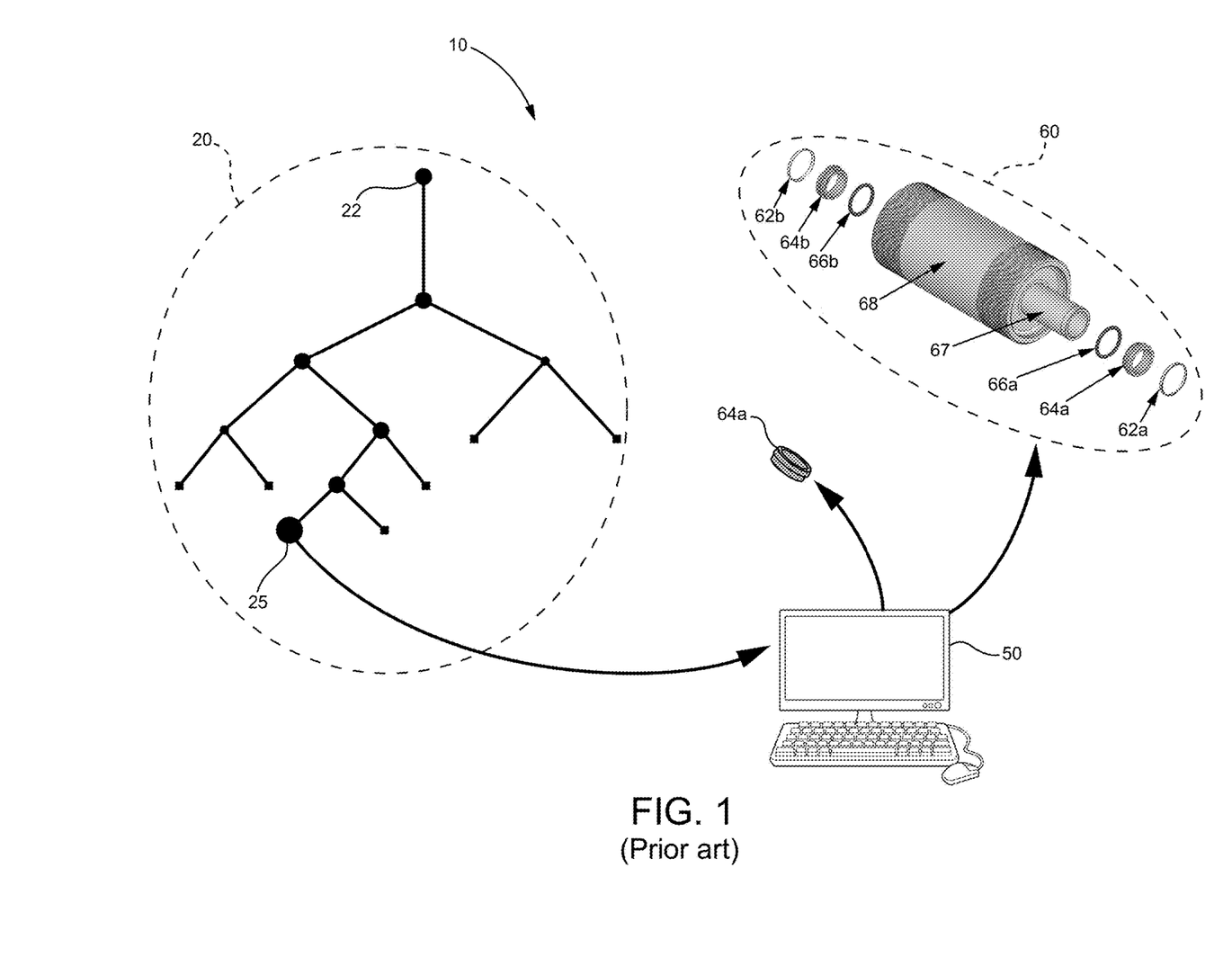
FIG. 1 is an embodiment of a common prior art decision tree diagnostic model utilized in the pressurized fluid cutting system field, in accordance with the present disclosure.

Referring to the drawings, FIG. 1 depicts an embodiment of a common prior art decision tree diagnostic model 10 utilized in the pressurized fluid cutting system field. A common technique for detecting potential problems with pressurized fluid cutting systems involves technicians passively monitoring cutting system operations looking for characteristics such as overstroke and/or distinct temperature changes of the pump output to give clues, after a system failure, as to which component(s) may have significantly deteriorated or completely failed. However, in utilizing passively perceived data points the technicians are merely reacting retroactively to a failure and are simply narrowing the list of potential failed components rather than actually diagnosing the real issue. An example of such retroactive diagnosis and response is depicted schematically in FIG. 1, which shows a common decision-making/troubleshooting tree 20 that a technician may progress through, via experience-based trial and error (or luck), to ultimately identify the failed component(s) and commence an appropriate remedy after the system failure. The common approach recognizes that, in addressing a component failure, elimination of the principal failure mode typically renders the most efficient return to optimal system performance. However, sometimes the operator progresses far down the decision tree 20 before the failure is accurately diagnosed. For example, an operator may notice a characteristic 22 of operation that is different than normal. From experience, the operator may note that such an anomaly characteristic 22 often is a result of known component and/or system failure. Hence, the operator may set out to diagnose the true cause of the failure by iteratively examining components and/or systems known to potentially be associated with such an anomaly characteristic 22, in an attempt to narrow down the list of potential failed components. Sometimes the operator identifies the problem after examining only one or a few components and/or systems. Yet, in other instances, the operator may move far down the decision tree 20 ruling out potential sources of the failure, until the true failed component 25 is discovered, as is shown in FIG. 1. Such iterative diagnostics performed in reaction to anomalistic characteristics 22 manifest due to system failure can be costly because of the extended downtime often associated with diagnosing and repairing/replacing the failed component or system.

Once a failed component 25 is finally identified, through the use of common diagnostic practices, then the operator may determine whether the component is part of an assembly or system and whether known failure tendencies of the assembly or system may warrant replacement of additional components. If replacement of the additional components is warranted, then the additional components may also be replaced during the same period during which the identified failed component 25 is replaced, to minimize downtime. For instance, as further exemplified in FIG. 1, an operator may march through the decision tree 20, following realization of an anomaly characteristic 22, to iteratively diagnose system health and identify a failed component 25. It may be determined that the failed component 25 is a high pressure seal 64*a*. The operator may input particulars regarding the discovered the failure into a computer 50 associated with the pressurized fluid cutting system. It may be determined that the failed high pressure seal 64*a* is part of a high pressure cylinder assembly 60, wherein the high pressure cylinder assembly includes two high pressure seals 64*a*-64*b*, two seal hoops 62*a*-62*b*, two O-ring seals 66*a*-66*b*, a back-up sleeve 67, and a high pressure cylinder 68. From experience and past operation history (which operation history may possibly be stored in the memory of the computer 50) it may determine that it would be beneficial to replace not only the failed high pressure seal 64*a*, but to replace all the components of the entire high pressure cylinder assembly 60, to help ensure proper functioning of the components and prevent potential future downtime should any of the components fail in the near future if not immediately replaced. In other words, often it is cheaper to replace components that may fail soon rather than experience additional downtime to replace them later if necessary.

Figure 2:
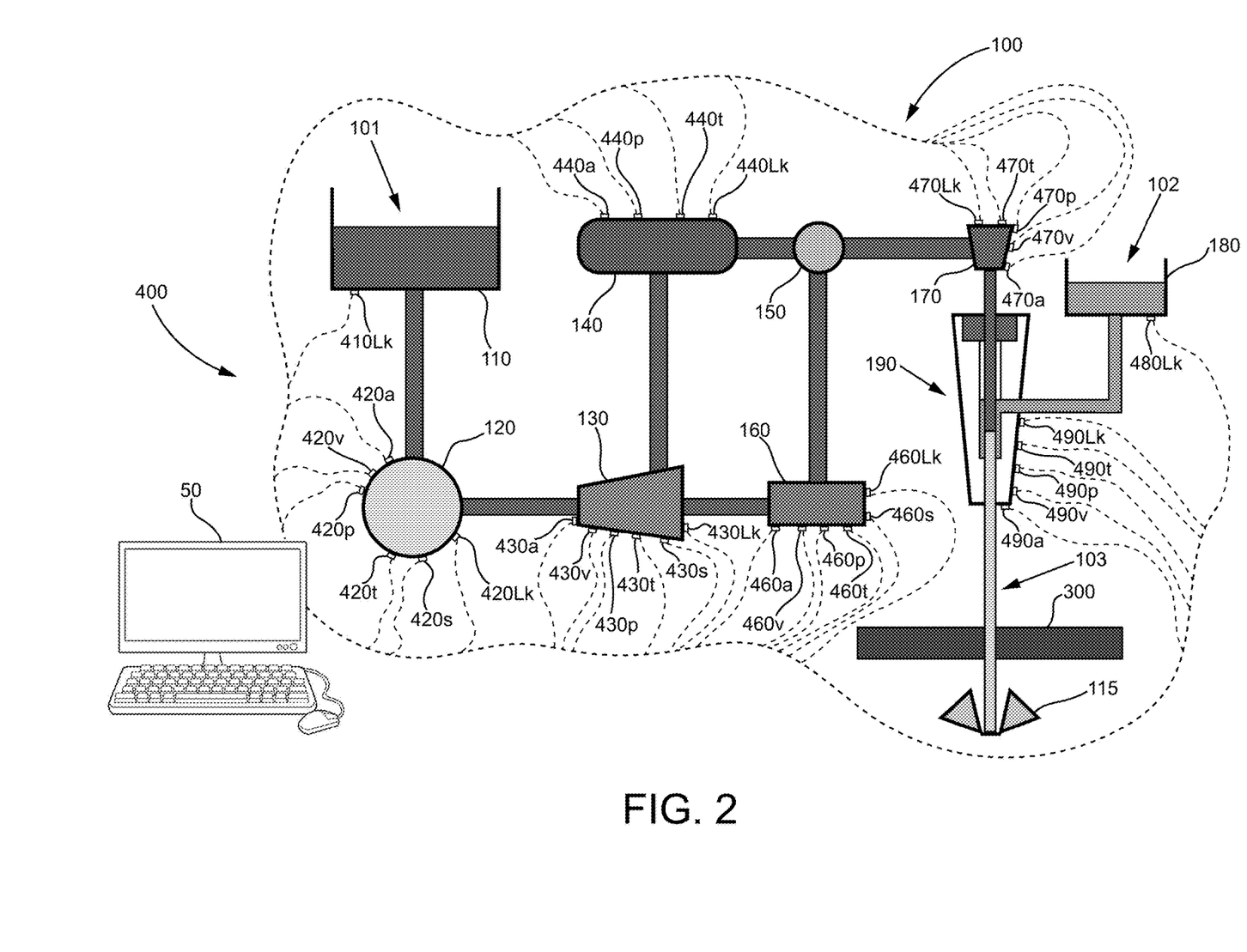
FIG. 2 is a schematic diagram of an embodiment of a pressurized fluid cutting system operable with a sensor-based diagnostics system having sensors disposed near cutting system components to monitor operations and help predict component failure(s), in accordance with the present disclosure.

The imprecise passive failure determination techniques and extended/costly downtime of typical pressurized fluid cutting systems associated with common diagnostic methodology are problematic. The present disclosure sets forth vastly more efficient solutions. With further reference to the drawings, FIG. 2 depicts a schematic diagram of an embodiment of a pressurized fluid cutting system 100 operable with a sensor-based diagnostics system 400 having sensors disposed near cutting system components to monitor operations and help predict component failure(s). Embodiments of the sensor-based diagnostics system 400 may comprise various structural and functional components that complement one another to provide the unique functionality and performance of the actively monitored and predictively diagnosed and maintained pressurized fluid cutting system 100, the structure and function of which will be described in greater detail herein.

As depicted schematically in FIG. 2, an embodiment of a pressurized fluid cutting system 100 may include a low pressure fluid reservoir 110, such as a holding tank, to store, or otherwise hold and/or provide an accumulation of fluid 101, such as water, that will be pressurized and utilized for cutting. The fluid 101 from the low pressure fluid reservoir 110 is in communication with a pump 120. The pump 120 is in fluid communication with an intensifier 130. The intensifier 130 is operable with an accumulator 140, controls 150, and a hydraulic unit 160, which are all working to increase the pressure of the fluid 101 and deliver the high pressure fluid to a valve 170. The valve 170 permits passage of pressurized fluid 101 into a nozzle unit 190 where it may be combined with an abrasive 102. The abrasive 102 may originate from an abrasive tank 180 where it is stored and readied for provision to the nozzle unit 190. The nozzle 190 directs a pressurized fluid cutting jet 103 toward a workpiece 300. The workpiece 300 is cut by the pressurized fluid cutting jet 103 and the fluid 101 and potential abrasive 102 comprising the cutting jet 103 then enters a drain and catcher 115, where the fluid 101 and potential abrasive 102 is prepared for either disposal or future recycled use. Those having ordinary skill in the pertinent art will recognize that the schematic depicted in FIG. 2 is merely exemplary and various known components, systems and features of a pressurized fluid cutting system may not be shown. Rather, the schematic sets forth common component elements of a pressurized fluid cutting system 100, to show how a sensor-based diagnostics system 400 may be incorporated therewith.

As further depicted in FIG. 2, an embodiment of a pressurized fluid cutting system 100 may be operable with a sensor-based diagnostics system 400 having sensors disposed near cutting system components to monitor operations and help predict component failure(s). The sensor-based diagnostics system 400 may be incorporated with, attached to, or otherwise be a structural and/or functional component of the pressurized fluid cutting system 100. Various types of sensors may be included in the sensor-based diagnostics system 400, such as vibration sensors v, temperature sensors t, pressure sensors p, audio sensors a, stroke sensors s, leak sensors Lk, and other like sensors operable for detecting pressurized fluid system operational characteristics and providing data regarding the same.

The various sensors of a sensor-based diagnostics system 400, such as sensors v, t, p, a, s and Lk, may be mounted on, connected to, or otherwise disposed near pressurized fluid system 100 components/systems. For example, a leak sensor 410Lk may be disposed in an appropriate location near the low pressure fluid reservoir to monitor whether the reservoir is leaking fluid, such as low pressure water. Moreover, several sensors, such as an audible sensor 420a, a vibration sensor 420v, a pressure sensor 420p, a temperature sensor 420t, a stroke rate sensor 420s and a leak sensor 420Lk, or other like sensors, may be mounted on or otherwise disposed in appropriate locations near the pump 120. Similarly, several sensors such as an audible sensor 430a, a vibration sensor 430v, a pressure sensor 430p, a temperature sensor 430t, a stroke rate sensor 430s and a leak sensor 430Lk, or other like sensors, may be mounted on or otherwise disposed in appropriate locations near the intensifier 130. Likewise, additional sensors, such as an audible sensor 440a, a pressure sensor 440p, a temperature sensor 440t and a leak sensor 440Lk, or other like sensors, may be mounted on or otherwise disposed in appropriate locations near the accumulator 140. Furthermore, sensors, such as an audible sensor 460a, a vibration sensor 460v, a pressure sensor 460p, a temperature sensor 460t, a stroke rate sensor 460s and a leak sensor 460Lk, or other like sensors, may be mounted on or otherwise disposed in appropriate locations near the hydraulic unit 160. Still further, several sensors, such as an audible sensor 470a, a vibration sensor 470v, a pressure sensor 470p, a temperature sensor 470t, and a leak sensor 470Lk, or other like sensors, may be mounted on or otherwise disposed in appropriate locations near the valve 170. A sensor, such as leak sensor 480Lk, may be mounted on or otherwise disposed in appropriate locations near the abrasive tank 180, to determine whether any abrasive is leaking. In a similar manner to what has been described herein, several sensors, such as an audible sensor 490a, a vibration sensor 490v, a pressure sensor 490p, a temperature sensor 490t, and a leak sensor 420Lk, or other like sensors, may be mounted on or otherwise disposed in appropriate locations near the nozzle 190.

The sensors operational with a sensor-based diagnostics system 400 may be in electrical or electromagnetic communication with a computer, such as computer 50. The communication between the sensors and the computer may be effectuated via signals passed through electrical wires connecting the sensors and the computer, or may be effectuated via wireless communication protocols. The communication means are shown schematically in FIG. 2 as dashed lines. Moreover, the sensors may be in communication with each other, and input from one sensor may affect operational functionality of sensors it is in communication with. It should be appreciated that many of the same types of sensors may be mounted on or otherwise disposed near pressurized fluid cutting system components and/or systems. For instance, there may be several pressure sensors 430p disposed to detect pressure characteristics of an intensifier 130.

The sensors may monitor, in real-time or near real-time, the operational characteristics of a pressurized fluid cutting system 100 and may provide active input regarding system functionality to the communicatively interconnected computer 50. The computer 50 may include or otherwise be in communication with common user interfaces, such as a keyboard, a screen, a touch-panel monitor such as an HMI display, and/or a mouse, so that an operator may utilize the computer 50 to see, review, analyze, extract, transmit, store, correlate and/or input data received from the sensors and act upon any related indicia representative of the data in any operable way.

Embodiments of a sensor-based diagnostics system 400 may facilitate active monitoring and analysis of pressurized fluid cutting system 100 performance and may correspondingly facilitate prediction of time duration extending into the future until complete component/system failure(s). The failure prediction may correspond to days, hours, minutes and/or seconds forecast to transpire in advance of a potential failure of a specific component or system of a pressurized fluid cutting system 100. The active failure prediction capability may enable operators to anticipate and proactively react to an impending component failure (e.g., schedule operations/jobs, perform preventative maintenance, replace aging components in scheduled and optimized downtime periods, and perform manual inspections only accomplishable during system downtime, etc.). In one embodiment of a sensor-based active diagnostics system 400, a combination of temperature, proximity, and drip/leak sensors may be utilized to indicate an upcoming failure of specific component(s). By interpreting/analyzing data from these multiple sensors the system 400 may be able to specifically identify what component or components may be approaching failure and instigate automated/associated prevention/reaction processes or allow an operator to prevent/react accordingly.

As shown schematically in FIG. 2, a number of sensors may be located along the fluid path through the pressurized fluid cutting system 100 and communicatively connected to key components of the system 100. During operation these sensors, such as pressure sensors p, temperature sensors t, audio sensors a, stroke rate sensors s, vibration sensors v, drip/leak sensors Lk, and/or other like sensors may actively monitor the performance and conditions of applicable components and track changes in conditions or behavior in the pressurized fluid cutting system 100. Sensing may be simultaneously effectuated at different locations within the pressurized fluid cutting system 100. Embodiments of an active sensor-based diagnostics system 400 may, for example recognize a temperature rise in the fluid at a certain location within the pressurized fluid cutting system 100, which temperature rise may indicate an impending failure of corresponding system 100 components. As a temperature sensor t actively detects the temperature rise, the sensor-based diagnostics system will begin processing other signals/sensors of the system 400 to identify what the failure mode will be (e.g., which components are likely approaching failure) and select from among the likely components which one will actually fail based upon data gathered from multiple sensors throughout the pressurized fluid cutting system 100. In some embodiments the sensor-based diagnostics system 400 may actively compare and contrast readings from various applicably-related sensors with each other to anticipate and/or interpret potential failures. This compare and contrast analysis is correlative between all actively available sensor input and may further include correlatively looking back into previously collected to data (e.g., historical data or system standards) to analyze the actively sensed behavior and correspondingly predict any potential failure.

In another example of sensor-based active diagnostics, as sensor, such as an audio sensor a, may be disposed in the system 100 and may detect a pump whistling sound—in the current state of the art, tribal knowledge (the technician in the industry today) would likely conclude that the whistling sound is caused by a poppet, which is failing/approaching failure as the chatter of poppet's parts resonate and emit an audible whistle; thus in the current state of the art the poppet would most likely be designated for replacement, when such a whistling sound is heard. Notably however, as shown in FIG. 1, typical trial-and-error type diagnostics are not only reactive (meaning the operating technician likely would not take any action until the audible whistle is so loud that failure has already occurred), but frequently do not yield accurate determinations of failure source until many iterative examinations are performed.

In contrast, an active sensor-based diagnostics system 400 utilizes a plurality of sensors and corresponding readings that may be checked in near real-time and correlated against the audio detection signal. For example, other sensors, such as temperature sensors t, may be disposed about the pressurized fluid cutting system 100, and the signal outputs of all of other sensors, including the temperature sensors t, may be correlatively compared against actively sensed functional characteristics of other pressurized fluid cutting system components, such as another pump or an intensifier component, and also against expected values (potentially stored in the memory of communicatively connected computer 50) for the input operational conditions. The active sensor-based diagnostics system 400 may identify that a center section of a pump is about ten degrees warmer than expected. This determination may correlatively prompt the diagnostics system 400 to then computer-analyze data for the last fifty days of operation for this specific pump system. In the disclosed example, it could be that the diagnostics system identifies that 10 days prior to the audio signal (whistling being detected by an audio sensor a) the center section temperature went up 10 degrees and stabilized. By comparing the correlated results and analysis against the stored historical data, the diagnostics system 400 may be able to determine that the initially suspected poppet is an incorrect fix. Rather, through active sensing and correlated diagnostics, the system 400 may determine that T-seals in a piston that holds a plunger are approaching/beginning to fail and should be replaced. Such an active diagnostic analysis allows the system 400 to predict potential failure before it occurs.

Figure 3:
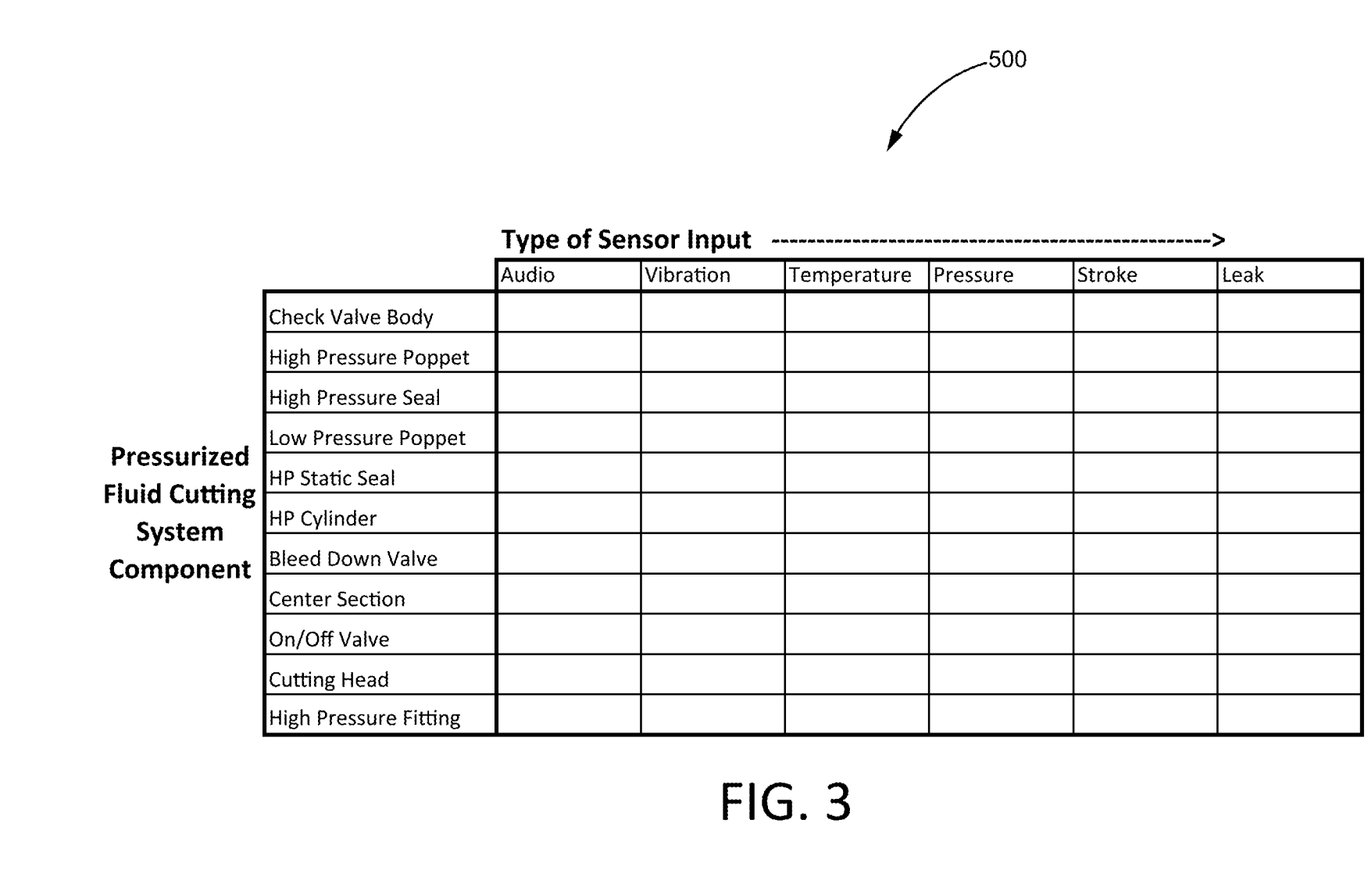
FIG. 3 is a schematic diagram of an embodiment of a correlations table visually depicting sensed pressurized fluid cutting system characteristics, in accordance with the present disclosure.

With further reference to the drawings, FIG. 3 depicts a schematic diagram of an embodiment of a correlations table 500 visually depicting sensed pressurized fluid cutting system 100 characteristics. The sensors and associated signals used and analyzed by embodiments of a sensor-based diagnostics system 400 may include any number of sensors located about the pressurized fluid cutting system 100 and the table may facilitate charted functional characteristic associations. Such sensors may include audio, vibration, temperature, pressure, stroke rate and drip/leak sensors (a, v, t, p, s, and Lk), and other like sensors. System 100 components the sensors may actively monitor may include check valve bodies, high pressure poppets, high pressure seals, low pressure poppets, high pressure (HP) static seals, high pressure (HP) cylinders, bleed down valves, center sections of pumps and/or intensifier units, on/off valves, cutting heads, high pressure fittings, and many other like components operational with a pressurized fluid cutting system 100. For example, a pressure transducer may disposed on a low pressure water line, a temperature sensor disposed on a high pressure water line (e.g., in an output adapter for a high pressure (HP) poppet), drip/leak detection sensors may be disposed about the system, a temperature sensor may be disposed in, on or near a high pressure cylinder, a stroke rate sensor may disposed in, on or near a pump, and other like sensors etc., may be located and utilized for actively monitoring functional characteristics of component elements and features of a pressurized fluid cutting system 100.

Embodiments of sensor-based diagnostics systems 400 may implement and utilize access to, correlation between, and analysis of the signals from the various multiple sensors, along with stored historical functionality data, to accurately predict specific component failures. Failure prediction may be facilitated by correlating actively sensed characteristics of components of a pressurized fluid cutting system 100. The correlating may comprise identifying sensor readings that are above a threshold value. For instance, a signal from the pressure transducer on a low pressure water line may manifest a reading above a set pressure threshold initially suggesting potential poppet failure. Meanwhile, a signal from a temperature sensor on the high pressure water line may manifest a temperature reading above a set temperature threshold indicating a potential cylinder crack if correlative leakage is detected from applicable drip/leak detection sensors—if there is no leakage then the potential failure source may be, for example, at least one of a set of parts comprising: a low pressure poppet, a check valve body, a seat, or a high pressure poppet. With the presence of a temperature signal and a pressure signal on the low pressure transducer the sensor-based diagnostics system 100 may determine that it is the low pressure poppet that is likely tending toward failure. Moreover, if the stroke rate sensor indicates overstroke then the sensor-based diagnostics system 400 may also determine that there is a failure tendency associated with low pressure poppet. Additionally, if the sensor-based diagnostics system 400 detects a temperature increase signal and no correlative spike in pressure, then it may be determined that at least one of a set of parts comprising the low pressure poppet, the seat, and/or the check valve are tending toward failure. The system may identify a part, such as the low pressure part, is in a first identified set of parts, as well as a second identified set of parts. Thereby revealing greater probability regarding source of a failure mode. An advantage of a sensor-based diagnostics system 400 over common diagnostic practices is that actively-sensed near-real-time system 100 functionality knowledge may help to simplify maintenance and repair procedures, as the operating technician, acting on indicia corresponding to such knowledge, may only have to remove and inspect an outlet portion of the pressurized fluid cutting system 100 to corroborate diagnosed failure modes. A technician may be able to interface with the system 400, for example through an HMI display associated with the computer 50, and run various sensor-based correlative diagnostics in near real time, while the pressurized fluid system 100 is operating, to identify any potential failures.

Through the provision and utilization of a multitude of sensors (as schematically depicted, for example, in FIG. 2) and their associated signals and data points correlated between actively monitored characteristics (as schematically depicted, for example in FIG. 3) and historical system functionality, embodiments of a sensor-based diagnostics system 400 may be able to actively monitor the life and operational fitness of components within a pressurized fluid cutting system 100. Such active diagnostic capability may provide system operators and maintenance technicians accurate maintenance predictions and timetables. The readings and signals from a number of sensors disposed about a pressurized fluid cutting system 100 may be set forth as corresponding indicia facilitating visualized prediction of potential near term component failure and operational fitness. In addition, further correlative comparison against historical data points may also help to identify specific component failure tendencies. The computer 50 may perform analysis and correlation of sensed operational characteristics of the pressurized fluid cutting system 100. Hence, a potential failure may be identified, by computer-effectuated analysis of the correlated data associated with sensed characteristics. Moreover, a first sensed characteristic may indicate that two possible parts are potentially failing. Then, a second sensed characteristic could be computer-correlated, to check if one of the two potentially failing parts is running correctly. If so, then it be determined that the other of the two parts is the failing component. Sensor-based diagnostics systems 400 may implement measurement methodology, such as acquisition and interpretation of active sensor-monitored/reported component functionality and may implement analytic correlation methodology, such as cross-referencing sensor signals of a plurality of sensors disposed near component elements of a pressurized fluid cutting system 100, to actively determine and verify anticipated component failures in ways not possible through common diagnostic efforts. As a result, system performance may be increased, downtime may be minimized, and output may be optimized.

The components and features defining embodiments of the above-described pressurized fluid cutting system 100 and corresponding sensor-based active diagnostics system 400 may be formed of any of many different types of materials or combinations thereof that can readily be formed into shaped objects provided that the components selected are consistent with the intended operation of pressurized fluid cutting systems 100 and corresponding sensor-based active diagnostics systems 400 of the type disclosed herein. For example, and not limited thereto, the components may be formed of: rubbers (synthetic and/or natural) and/or other like materials; glasses, such as fiberglass, silicate glass, naturally occurring glass, or any other amorphous solid material, any combination thereof, and/or other like materials; ceramics or any other crystalline or partly crystalline material, any combination thereof, and/or other like materials; wood or any other hard, fibrous structural tissue or material, any combination thereof, and/or other like materials; carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining the above-described pressurized fluid cutting system 100 and corresponding sensor-based active diagnostics system 400 embodiment(s) may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, 3-D printing, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A method of identifying a failing component in a pressurized fluid cutting system, the method comprising:
    actively sensing, via a first sensor, a first characteristic of the pressurized fluid cutting system and gathering data pertaining to the sensed first characteristic to indicate a first set of two or more possibly failing components of the pressurized fluid cutting system;
    actively sensing, via a second sensor that is discrete from the first sensor, a second characteristic of the pressurized fluid cutting system and gathering data pertaining to the sensed second characteristic, wherein the sensed first characteristic comprises a different type of characteristic than the sensed second characteristic;
    correlating the data pertaining to the sensed first characteristic, sensed by the first sensor, with the data pertaining to the sensed second characteristic, sensed by the second sensor such that the first set of two or more possibly failing components of the pressurized fluid cutting system sensed by the first sensor is further narrowed by the correlating the data pertaining to the sensed first characteristic with the data pertaining to the sensed second characteristic; and
    identifying the failing component out of the first set of two or more possibly failing components of the pressurized fluid cutting system, by a computer-effectuated analysis that identifies a correlation between the data pertaining to the sensed first characteristic and the data pertaining to the sensed second characteristic.

2. The method of claim 1,
    wherein the data pertaining to the sensed first characteristic indicates a potential failure of at least one component of the first set of two or more possibly failing components of the pressurized fluid cutting system;
    wherein the data pertaining to the sensed second characteristic indicates a potential failure in a second set of two or more possibly failing components of the pressurized fluid cutting system; and wherein the identifying includes identifying a same physical component that is in the first set and the second set of two or more possibly failing components of the pressurized fluid cutting system.

3. The method of claim 1,
wherein the data pertaining to the sensed first characteristic indicates a potential failure of two different components of the first set of two or more possibly failing components of the pressurized fluid cutting system;
wherein the data pertaining to the sensed second characteristic indicates proper function of a first component of the first set of two or more possibly failing components of the pressurized fluid cutting system; and
wherein the identifying includes determining that a second component, of the two different components of the first set of two or more possibly failing components of the pressurized fluid cutting system, is the failing component.

4. The method of claim 1, wherein the actively sensing, via the first sensor, is accomplished by at least the first sensor actively measuring one of the following:
   a. audio,
   b. vibration,
   c. pressure,
   d. stroke rate, and
   e. leak rate.

5. The method of claim 1, wherein the failing component comprises one of a:
   a. check valve body,
   b. poppet,
   c. seal,
   d. static seal, and
   e. cylinder.

6. The method of claim 1, wherein the actively sensing, via the first and second sensor, is simultaneously effectuated by at least the first and the second sensors positioned at different locations within the pressurized fluid cutting system.

7. The method of claim 1, further comprising predicting, via computer analysis, a period of time extending into a future until complete failure of the identified failing component occurs.

8. The method of claim 1, further comprising identifying the failing component based upon an analysis of past performance data associated with historic functionality corresponding to the sensed first and second characteristics.

9. A method of identifying a failing component in a pressurized fluid cutting system, the method comprising:
   sensing a first characteristic of the pressurized fluid cutting system using a first measurement methodology, the first measurement methodology in communication with a computer;
   sensing a second characteristic of the pressurized fluid cutting system using a second measurement methodology, the second measurement methodology in communication with the computer, wherein the first measurement methodology measures a different type of characteristic than does the second measurement methodology;
   identifying, via the first measurement methodology, that a sensed first characteristic has varied from a first threshold reading so as to identify a set of two or more possibly failing components of the pressurized fluid cutting system;
   identifying, via the second measurement methodology, that a sensed second characteristic has varied from a second threshold reading; and
   correlating data communicated to the computer in association with the sensing of the first characteristic and the sensing of the second characteristic to computer-analyze the sensed first and second characteristics and finding a correlation between the sensed first and second characteristics to further narrow down the set of two or more possibly failing components to identify the failing component of the pressurized fluid cutting system from the set of two or more possibly failing components.

10. The method of claim 9, further comprising sensing a third characteristic of the pressurized fluid cutting system, and wherein the correlating the data communicated to the computer further comprises finding a correlation between the third characteristic and the sensed first and second characteristics.

11. The method of claim 9, wherein the first measurement methodology and the second measurement methodology are configured to communicate with each other, and wherein input from the first measurement methodology affects operational functionality of the second measurement methodology.

12. The method of claim 9, wherein a plurality of sensors and corresponding sensor readings are checked in near real-time and correlated against the sensed first and second characteristics.

13. The method of claim 9, wherein signals from a number of sensors disposed about the pressurized fluid cutting system are correlated with regard to the first and second measurement methodologies and set forth as corresponding indicia facilitating visualized prediction of near term component failure.

14. The method of claim 9, wherein a technician interfaces with the computer, through operation of an HMI display, and runs various sensor-based correlative diagnostics, while the pressurized fluid cutting system is operating, to identify any potential failures.

15. A system for identifying a failing component of a pressurized fluid cutting system, comprising:
   the pressurized fluid cutting system;
   a computer;
   a first sensor in signal communication with the computer and configured to sense a first characteristic of the pressurized fluid cutting system to identify a set of two or more possibly failing components of the pressurized fluid cutting system, the first characteristic being selected from at least one of vibration, temperature, pressure, audio, stroke rate, and drip/leak;
   a second sensor that is discrete from the first sensor, that is in signal communication with the computer, and that is configured to sense a second characteristic of the pressurized fluid cutting system, the second characteristic being selected from at least one of vibration, temperature, pressure, audio, stroke rate, and drip/leak, wherein the first sensor senses a different type of characteristic of the pressurized fluid cutting system than does the second sensor; and
   a user interface in communication with the computer and configured to display indicia of the failing component, wherein the indicia of the failing component is generated by finding, by the computer, a correlation between a sensed first characteristic of the pressurized fluid cutting system, sensed by the first sensor, and a sensed second characteristic of the pressurized fluid cutting system, sensed by the second sensor, with the correlation between the sensed first characteristic and the sensed second characteristic further narrowing down the set of two or more possibly failing components identified by the first sensor, to identify the failing component, out of the set of two or more possibly failing components of the pressurized fluid cutting system.

16. The system of claim 15, wherein finding the correlation between the sensed first and second characteristics comprises utilization of a correlations table to chart characteristic associations.

17. The system of claim 15, wherein the sensed first and second characteristics include threshold values.

18. The system of claim 17, wherein the finding the correlation between the sensed first and second characteristics comprises identifying sensor readings from the first and second sensors that vary from a threshold value.

19. The system of claim 15, further comprising a third sensor in signal communication with the computer and configured to sense a third characteristic of the pressurized fluid cutting system.

20. The system of claim 19, wherein the finding the correlation between the sensed first and second characteristics further comprises correlating a sensed third characteristic with the sensed first and second characteristics to identify the failing component by the computer.

* * * * *